United States Patent
Tsuzuki

(10) Patent No.: US 7,327,047 B2
(45) Date of Patent: Feb. 5, 2008

(54) GAS TURBINE ENGINE GENERATOR SYSTEM

(75) Inventor: Sadachika Tsuzuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/377,682

(22) Filed: Mar. 17, 2006

(65) Prior Publication Data

US 2006/0220387 A1   Oct. 5, 2006

(30) Foreign Application Priority Data

Mar. 29, 2005   (JP) ............................... 2005-093458

(51) Int. Cl.
*F01D 15/10* (2006.01)

(52) U.S. Cl. ...................................... 290/52

(58) Field of Classification Search ................... 290/52
See application file for complete search history.

(56) References Cited

U.S. PATENT DOCUMENTS

| | | | |
|---|---|---|---|
| 6,031,294 A * | 2/2000 | Geis et al. ..................... | 290/52 |
| 6,093,975 A * | 7/2000 | Peticolas ..................... | 290/52 |
| 6,724,098 B2 * | 4/2004 | Ortega et al. ................. | 290/52 |
| 6,958,550 B2 * | 10/2005 | Gilbreth et al. ............... | 290/52 |

FOREIGN PATENT DOCUMENTS

WO    WO 99/32769    7/1999

* cited by examiner

*Primary Examiner*—Joseph Waks
(74) *Attorney, Agent, or Firm*—Squire, Sanders & Dempsey L.L.P.

(57) ABSTRACT

In a gas turbine power generator system, when there is an increase in the demand of a user system, a battery system supplies a supplemental electric power which is given by adding an added electric power to a difference between a current output of the power generator and the increased demand. Because the supplemental electric power is greater than the difference between the current output of the generator and the increased demand by the added electric power, the load acting upon the gas turbine engine is correspondingly reduced even from the preceding steady state so that the gas turbine engine can quickly accelerate to the level that matches the increased demand of the user system. Therefore, the battery system is required to supply electric power only for a relatively short time as compared to the case where the supplemental electric power is equal to the difference between the output of the power generator and the demand, and the capacity of the battery system may be smaller than the case where the battery meets the entire demand while the gas turbine engine is being accelerated.

2 Claims, 6 Drawing Sheets

GAS TURBINE ENGINE GENERATOR SYSTEM

TECHNICAL FIELD

The present invention relates to a gas turbine engine generator system, and in particular to a gas turbine engine generator system which can quickly respond to the change in the load of the system while minimizing the system requirements.

BACKGROUND OF THE INVENTION

A gas turbine engine generator system is currently a preferred form of generator system in various fields, and, in particular, is considered to be suitable for use in a cogeneration system because the waste heat which the gas turbine engine produces can be readily recovered for use as a heat source for space heating, utility hot water and other useful purposes.

When the gas turbine engine is operated so as to maintain the internal temperature of the engine at a limit operating temperature, a high efficiency and a minimum emission can be both achieved. Therefore, when the load of the engine is increased, it is desirable that the rotational speed of the engine is increased while maintaining the internal temperature of the engine at the limit operating temperature. In other words, when the demand for electric power increases, the supply of fuel to the engine is required to be increased in such a manner that the rotational speed of the engine may be increased to a target rotational speed that matches the increase in the demand for electric power or the load while controlling the internal temperature of the engine so as to maintain the efficiency of the engine and the emission level at an acceptable level.

A gas turbine engine cannot be accelerated as rapidly as desired because the inertia mass of the rotating members resists acceleration. Also because the engine is operated with the internal temperature near the limit operating temperature all times, the margin for increasing the supply of fuel is small, and this prevents a rapid acceleration of the engine. Therefore, when a demand for electric power suddenly increases, a certain time lag is inevitable before the rotational speed of the engine reaches the target rotational speed that matches the increased demand.

When there is a need to match the output of a gas turbine engine generator to a demand without any such time lag, it has been practiced to use a battery to fill the shortage of the power output while the gas turbine engine accelerates. According to this method, as illustrated in FIG. 5, the difference between the demand and the output is simply filled by the supply of electric power from the battery.

However, according to this method, because the gas turbine engine operates under a limit condition the whole time, it takes a relatively long time for the rotational speed of the gas turbine engine to reach the target value. Therefore, the battery is required to supply electric power for a correspondingly long time so that the total amount of electric power (as indicated by the hatched area in the graph of FIG. 5) which the battery has to produce is significant, and a correspondingly large battery is required.

It is also known from WO99/32769A1 to temporarily stop the generation of electricity by the gas turbine engine while the engine is being accelerated and supply the entire demand solely from the battery during this process as illustrated in FIG. 6. According to this method, the gas turbine engine can accelerate relatively rapidly so that the time period during which the battery has to supply electric power is significantly reduced and the total amount of the electric power that the battery has to supply is somewhat reduced. However, the battery still has to be large enough to be able to produce a large current and meet the entire demand. Also, repeated discharge of large currents is known to reduce the service life of the battery, and this increases the running cost of the system. Furthermore, the absence of load during the time of acceleration lowers the internal temperature of the engine, and this temporarily causes a drop in the engine efficiency and an increase in the emission.

The battery used for this purpose typically consists of a lead battery which is relatively heavy and bulky. Therefore, the reduction in the requirement of the battery is highly essential for an overall compact design of a gas turbine engine generator system. As a lead battery is required to be replaced every now and then, the need for a large battery means an increased running cost.

BRIEF SUMMARY OF THE INVENTION

In view of such problems of the prior art, a primary object of the present invention is to provide a gas turbine engine generator system which allows the engine to be able to promptly respond to an increase in the load without requiring a large battery.

A second object of the present invention is to provide a gas turbine engine generator system which allows the engine to be able to promptly respond to an increase in the load without increasing the initial or running cost.

According to the present invention, such an object can be accomplished by providing gas turbine power generator system, comprising: a gas turbine engine; a power generator connected to the gas turbine engine so as to be driven by the gas turbine engine; an engine control unit for controlling an operation of the gas turbine engine; a battery system; and a power control unit for controlling the engine control unit according to a demand from a user system, and for controlling flow of electric power from the power generator to the battery system and from the power generator and battery system to the user system; wherein the power control unit is configured such that upon increase in the demand from the user system the engine is accelerated to a level required to meet the increase in the demand and feeding a supplementary electric power from the battery system to the user system while the gas turbine engine is being accelerated, the supplemental electric power being given by adding an added electric power to a difference between a current output of the power generator and the increased demand of the user system.

Because the supplemental electric power is greater than the difference between the current output of the generator and the increased demand by the added electric power, the load acting upon the gas turbine engine is correspondingly reduced even from the preceding steady state so that the gas turbine engine can quickly accelerate to the level that matches the increased demand of the user system. Therefore, the battery system is required to supply electric power only for a relatively short time as compared to the case where the supplemental electric power is equal to the difference between the output of the power generator and the demand, and the capacity of the battery system may be smaller than the case where the battery meets the entire demand while the gas turbine engine is being accelerated.

According to a preferred embodiment of the present system, the added electric power is given as a mathematical function of at least one of a rotational speed of the gas turbine engine and the demand from the user system. The added electric power may consist of a constant value, but may also be variable depending on various factors so that an optimum choice may be made on the capacity and size of the battery system for the given system specifications and the type of the battery system.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
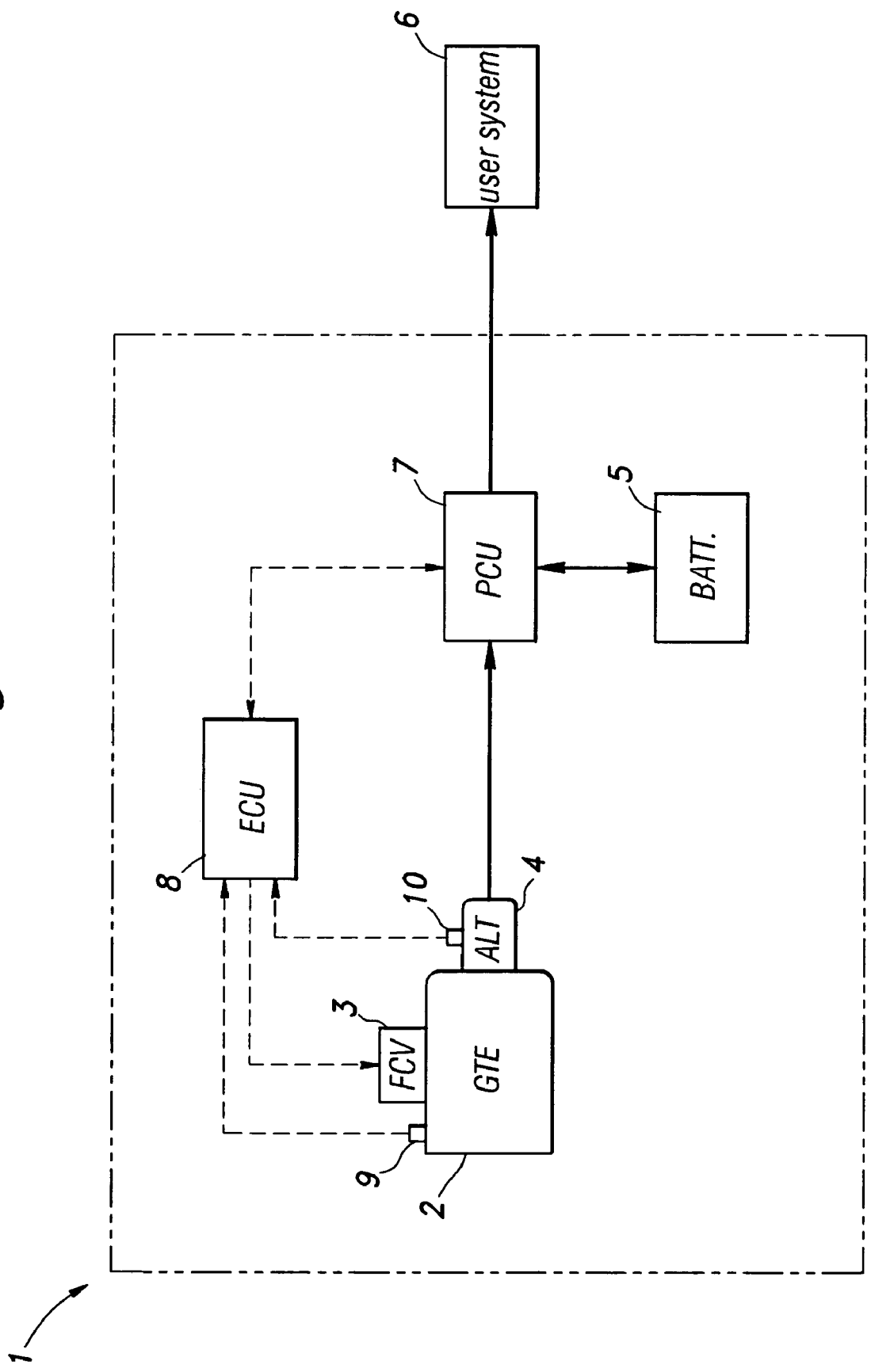
FIG. 1 is a simplified block diagram of a gas turbine generator system embodying the present invention.

FIG. 1 shows a gas turbine engine power generator system 1 embodying the present invention, and this power generator system 1 comprises a gas turbine engine 2, a fuel supply valve 3 for supplying fuel to the gas turbine engine 2, an alternator (power generator) 4 driven by the gas turbine engine 2, a battery system 5 for storing the electric power generated by the alternator 4, a power control unit 7 for controlling the alternator 4 and battery system 5 according to the state of a user system 6 and an engine control unit 8 for controlling the mode of operation of the gas turbine engine 2. The gas turbine engine 2 is provided with an air temperature sensor 9 for detecting the air temperature at the inlet end of the combustion chamber, and the output of this air temperature sensor 9 is forwarded to the engine control unit 8. The alternator 4 is provided with a rotational speed sensor 10 for detecting the rotational speed of the alternator 4 and hence the rotational speed of the gas turbine engine 2, and the output of this rotational speed sensor 10 is also forwarded to the engine control unit 8.

The power control unit 7 is designed to control the output of the alternator 4, and comprises a converter unit for converting the AC output of the alternator 4 into DC power and an inverter unit for converting this DC power and/or the DC power stored in the battery system 5 into commercial AC power. The engine control unit 8 comprises a microcomputer, ROM, RAM, peripheral circuits, input/output interfaces and various driver circuits, and is configured to control the fuel supply valve 3 according to various control programs stored in the ROM. The engine control unit 8 is in turn controlled by the power control unit 7.

Figure 2:
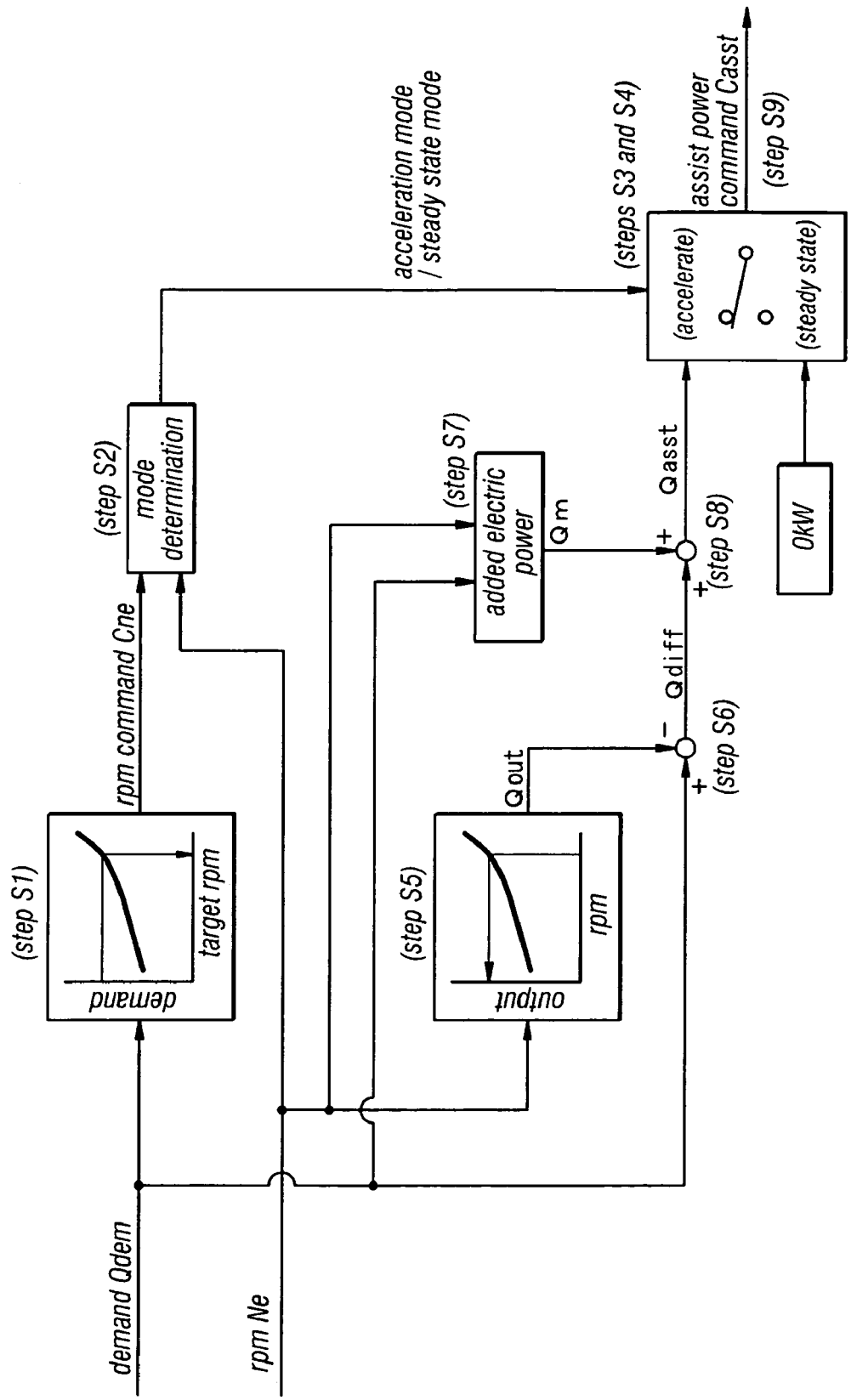
FIG. 2 is a block diagram showing the logic in determining the amount of electric power that needs to be supplemented.
Figure 3:
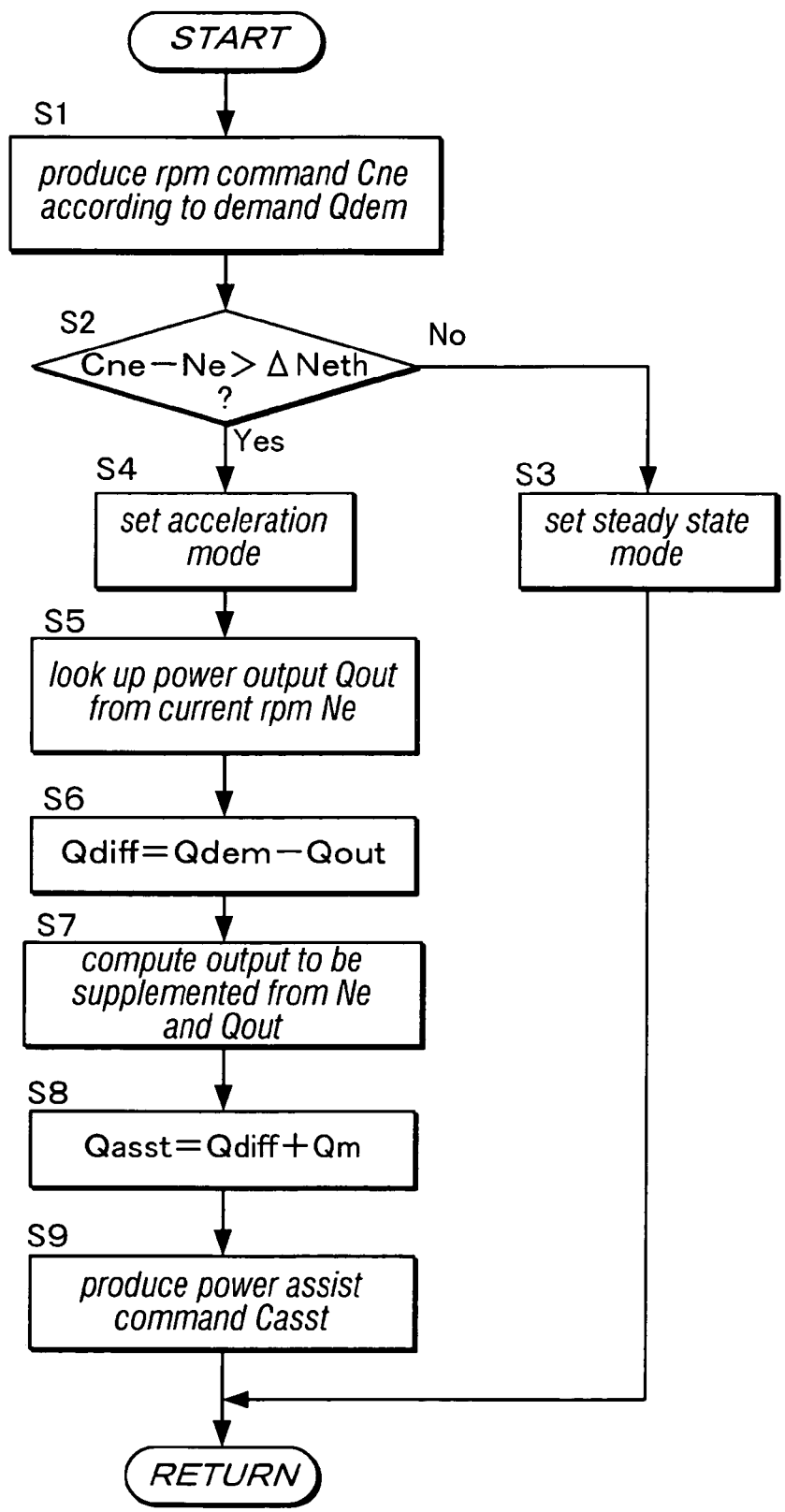
FIG. 3 is a flowchart showing the control flow in supplying a supplementary electric power when there is a sudden increase in the demand.

During the operation of the gas turbine power generator system 1, the power control unit 7 and the engine control unit 8 carry out the following control process as illustrated in the block diagram of FIG. 2 and the flowchart of FIG. 3.

First of all, in step S1, a power demand Qdem of the user system 6 is detected by the power control unit 7 and is converted into a corresponding target rotational speed of the gas turbine engine 2 (or the alternator 4) by looking up a load-rotational speed map stored in the power control unit 7. The corresponding rotational speed command Cne is then forwarded to the engine control unit 8. In step S2, a comparison is made between the rotational speed command Cne and the actual rotational speed Ne of the gas turbine engine 2 detected by the rotational speed sensor 10, and it is determined if the difference between them is greater than a prescribed threshold value ΔNeth. If it is not the case, the engine control unit 8 selects a steady state mode in step S3 (or the power control unit 7 does not supply any supplemental electric power from the battery system 5 to the user system 6), and the program flow returns to the start point. In other words, there is no significant change in the load and the engine continues to operate under a steady state mode.

If the rotational speed command Cne is greater than the actual rotational speed Ne of the gas turbine engine 2 by more than the threshold value ΔNeth (step S2: yes), the engine control unit 8 selects an acceleration mode in step S4 as it means that there was an increase in the demand Qdem from the user system 6 and the engine I is required to accelerate so as to meet the increase in the load. However, as there is a delay in the acceleration of the engine rotational speed to the target level, the output of the alternator 4 is not able to meet the increase in the load until the engine is fully accelerated. To fill this shortage in the supply of electric power, the power control unit 7 supplies a supplemental electric power Qasst from the battery system 5 to the user system 6 while the engine 1 accelerates.

This supplemental electric power Qasst is determined as described in the following. The power control unit 7 detects the current output Qout from the alternator 10 in step S5. The output Qout can be given by a rotational speed—power output map for the gas turbine engine 2 that allows the gas turbine engine 2 to operate at a relatively high efficiency and with a low emission. Then, a difference Qdiff between the demand Qdem and the actual power output Qout is computed in step S6. In step S7, the engine control unit 8 determines an added electric power Qm according to the current rotational speed Ne and the demand Qdem by using a map not shown in the drawings or a formula. The supplemental electric power Qasst is given as a sum of the difference Qdiff between the demand Qdem and the actual power output Qout and this added electric power Qm in step S8. The supplemental electric power Qasst is then supplied from the battery system 5 to the user system 6.

When the demand Qdem is relatively great for the given rotational speed Ne, the supplemental electric power Qm is increased by a corresponding amount but is selected such that the gas turbine engine can continue to operate at a high efficiency and with a low emission.

Figure 4:
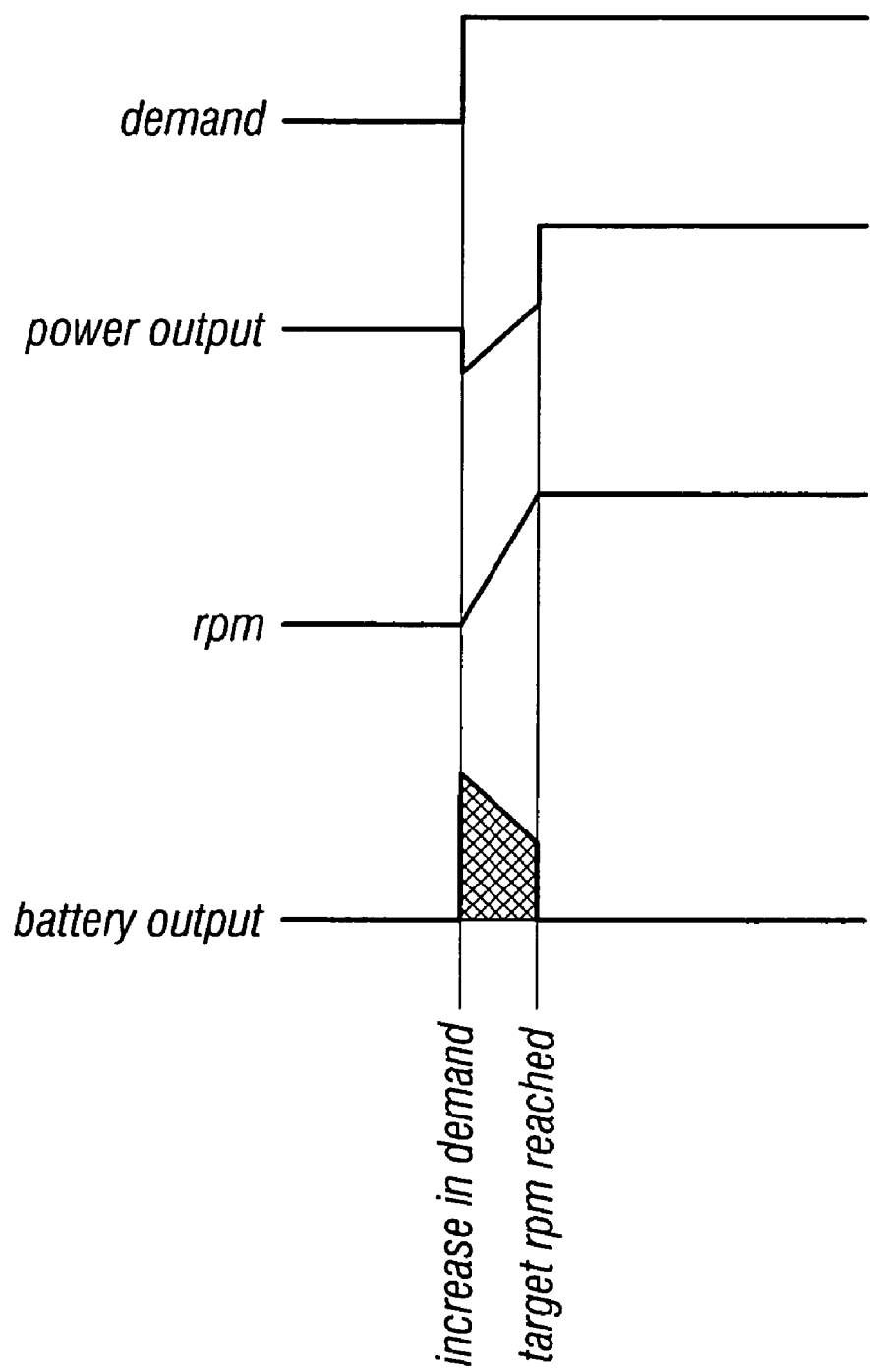
FIG. 4 is a graph showing the time history of the response of the system to an increase in the demand according to the present invention.
Figure 5:
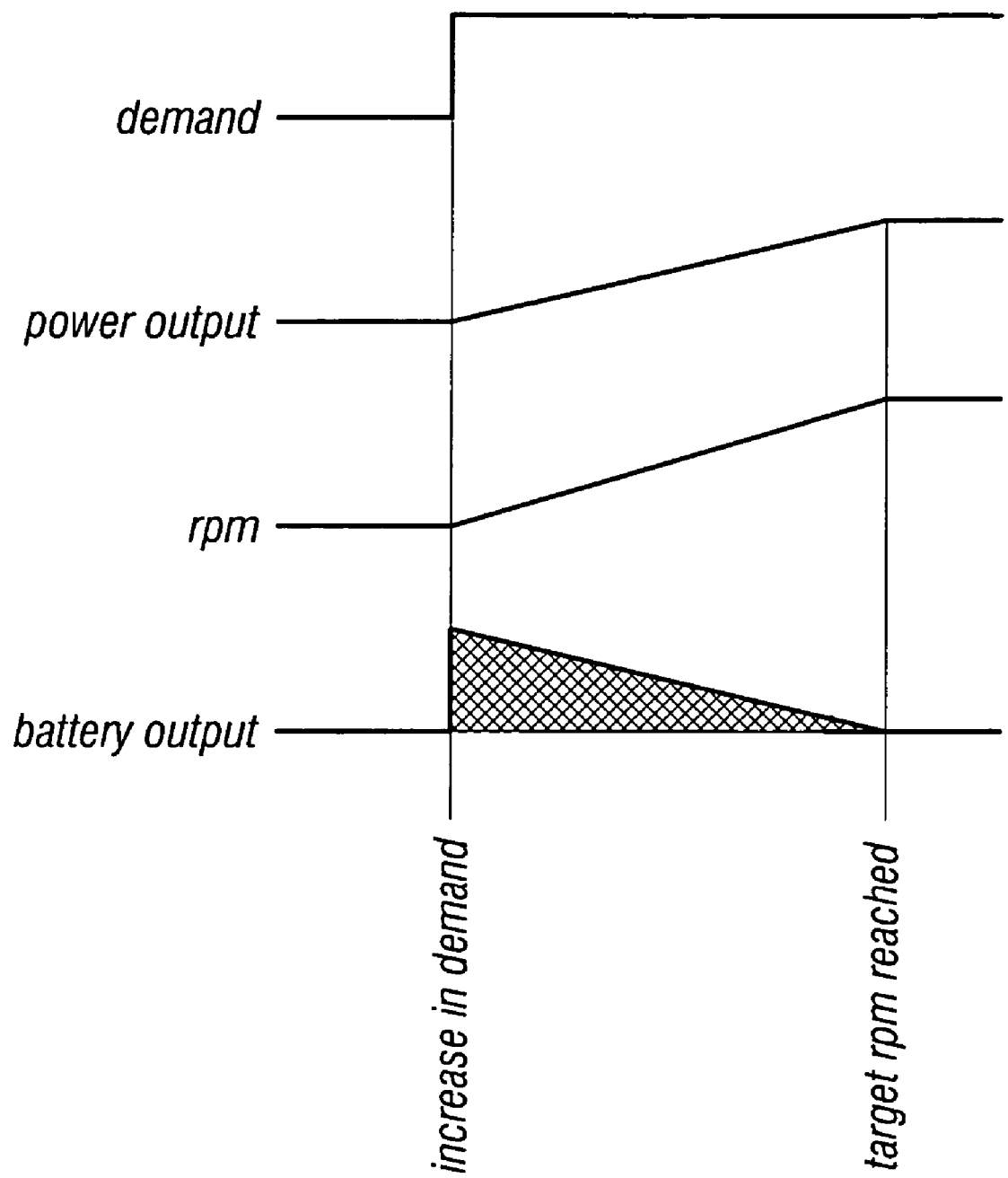
FIG. 5 is a graph similar to FIG. 4 according a conventional arrangement.
Figure 6:
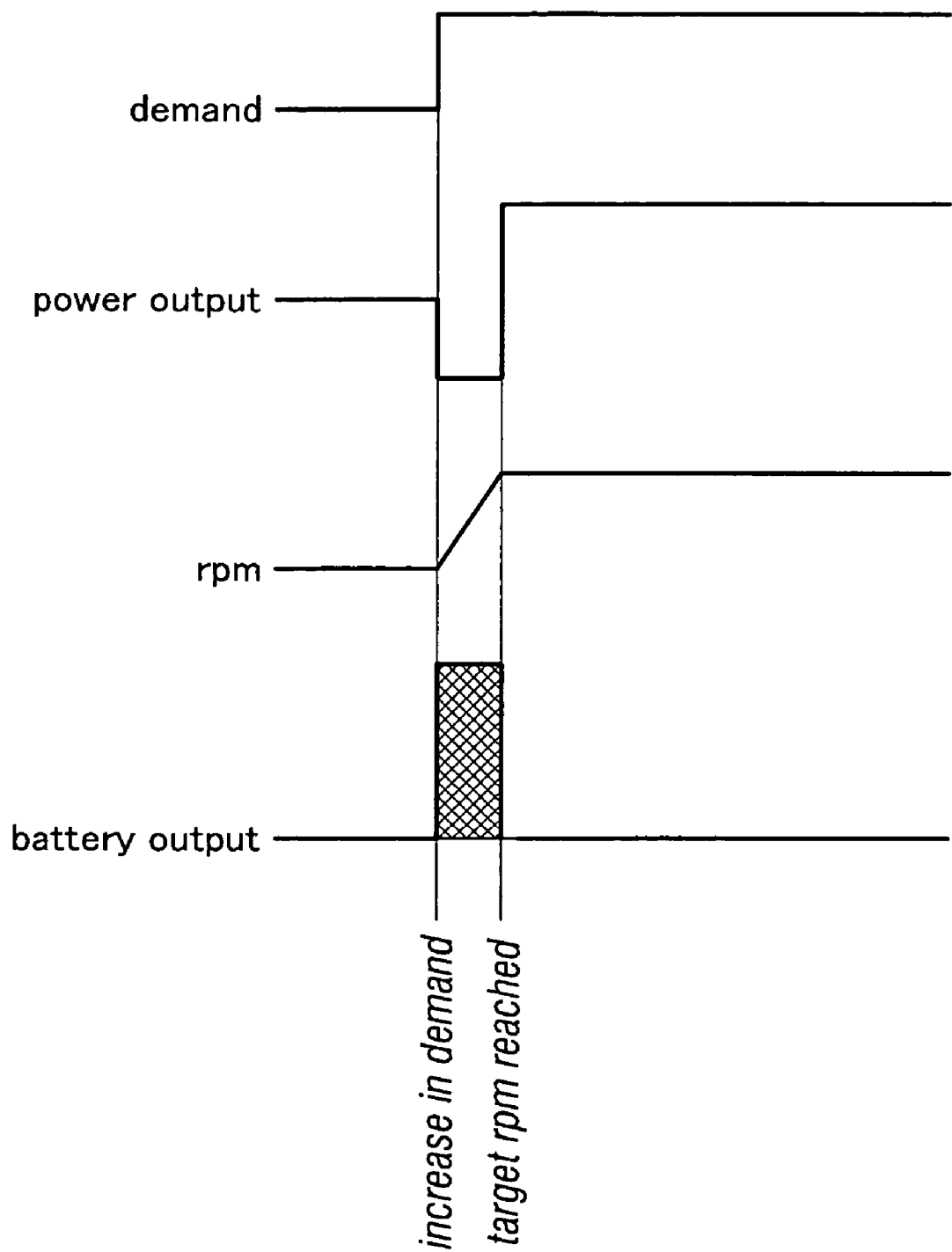
FIG. 6 is a graph similar to FIG. 4 according another conventional arrangement.

The engine control unit 8 controls the fuel supply valve 3 so that the rotational speed Ne of the gas turbine engine 2 matches the rotational speed command Cne, and the power control unit 7 supplies supplemental electric power Qasst from the battery system 5 to the user system 6 according to the supplemental electric power command Casst in step S9. As a result, as shown in FIG. 4, the output of the alternator 4 initially drops sharply by a certain amount, and the gas turbine engine which is somewhat freed from the load is enabled to relatively quickly accelerate and reach the target rotational speed so that the total electric power that the battery system 5 is required to supply can be reduced.

This was verified by an experimental test conducted by the inventor. The gas turbine engine was operated under a partial load condition with an acceleration margin of 1 kW. According to the conventional arrangement, it took ten seconds for the engine rotational speed to reach the target rotational speed that is required to meet the demand Qdem and the total amount of electric power that was supplied by the battery system was 50kWsec. On the other hand, according to the present invention, the engine was able to accelerate to the target rotational speed that is required to meet the demand Qdem in one second, and the total amount of electric power that was supplied by the battery system was only 15 kWsec. Thus, according to the present invention, the battery system 5 may be smaller in size and may have a smaller capacity than was possible with the conventional arrangement. This means that the gas turbine engine generator system I can be made more compact, and the manufacturing cost can be reduced.

Although the present invention has been described in terms of preferred embodiments thereof, it is obvious to a person skilled in the art that various alterations and modifications are possible without departing from the scope of the present invention which is set forth in the appended claims. For instance, the battery system was used in the foregoing embodiment as a means for storing electric power and providing the supplemental electric power, but may also be substituted by a capacitor system or any other means for storing electric power. The added electric power was given as a mathematical function of the current rotational speed of the power generator and the demand in the foregoing embodiment, but may also be given by a constant value.

The contents of the original Japanese patent application on which the Paris Convention priority claim is made for the present application are incorporated in this application by reference.

The invention claimed is:

1. A gas turbine power generator system, comprising:

a gas turbine engine;

a power generator connected to the gas turbine engine so as to be driven by the gas turbine engine;

an engine control unit for controlling an operation of the gas turbine engine;

a battery system; and a power control unit for controlling the engine control unit according to a demand from a user system, and for controlling flow of electric power from the power generator to the battery system and from the power generator and battery system to the user system;

wherein the power control unit is configured such that upon increase in the demand from the user system the engine is accelerated to a level required to meet the increase in the demand and feeding a supplementary electric power from the battery system to the user system while the gas turbine engine is being accelerated, the supplemental electric power being given by adding an added electric power to a difference between a current output of the power generator and the increased demand of the user system.

2. The gas turbine power generator system according to claim 1, wherein the added electric power is given as a mathematical function of at least one of a rotational speed of the gas turbine engine and the demand from the user system.

* * * * *